United States Patent
Shono

(10) Patent No.: US 8,836,308 B2
(45) Date of Patent: Sep. 16, 2014

(54) STEP-DOWN TYPE DC-DC REGULATOR

(75) Inventor: Ken Shono, Yokohama (JP)

(73) Assignee: Transphorm Japan, Inc., Yokohama (JP)

( * ) Notice: Subject to any disclaimer, the term of this patent is extended or adjusted under 35 U.S.C. 154(b) by 470 days.

(21) Appl. No.: 13/166,887

(22) Filed: Jun. 23, 2011

(65) Prior Publication Data

US 2012/0105146 A1  May 3, 2012

(30) Foreign Application Priority Data

Oct. 28, 2010  (JP) ................. 2010-242457

(51) Int. Cl.
*G05F 1/00* (2006.01)
*H02M 3/158* (2006.01)
*H02M 1/08* (2006.01)

(52) U.S. Cl.
CPC .......... *H02M 3/1588* (2013.01); *Y02B 70/1466* (2013.01); *H02M 1/08* (2013.01)
USPC ....................................................... 323/284

(58) Field of Classification Search
USPC ......... 323/223, 225, 271, 282, 284, 285, 234, 323/237, 265, 273–274
See application file for complete search history.

(56) References Cited

U.S. PATENT DOCUMENTS

| 6,141,200 A | * | 10/2000 | Hinedi et al. | 361/111 |
| 7,205,821 B2 | | 4/2007 | Rutter | |
| 2003/0107905 A1 | * | 6/2003 | Miura et al. | 363/41 |
| 2005/0020969 A1 | * | 1/2005 | Slate et al. | 604/65 |
| 2005/0184797 A1 | * | 8/2005 | Choi | 327/541 |
| 2010/0013451 A1 | * | 1/2010 | Nakamura et al. | 323/282 |
| 2010/0117737 A1 | * | 5/2010 | Kondo et al. | 330/276 |

FOREIGN PATENT DOCUMENTS

| JP | 2006-508629 | 3/2006 |
| JP | 2007-185050 | 7/2007 |
| JP | 2010-27709 | 2/2010 |
| WO | WO 2004/051851 | 6/2004 |

* cited by examiner

*Primary Examiner* — Adolf Berhane
*Assistant Examiner* — Jeffrey Gblende
(74) *Attorney, Agent, or Firm* — Fish & Richardson P.C.

(57) ABSTRACT

A first transistor coupled between a power supply line and an inductor, a second transistor coupled between a source of the first transistor and a reference voltage line, and a third transistor coupled between the source of the first transistor and a load are included, and efficiency deterioration caused by a dead time is improved by keeping a current flow through a current path of an inductor, a load, and the third transistor during the dead time by supplying a voltage which is less than a threshold voltage and approximately the threshold voltage to a gate of the third transistor as a gate voltage.

2 Claims, 4 Drawing Sheets

F I G. 1
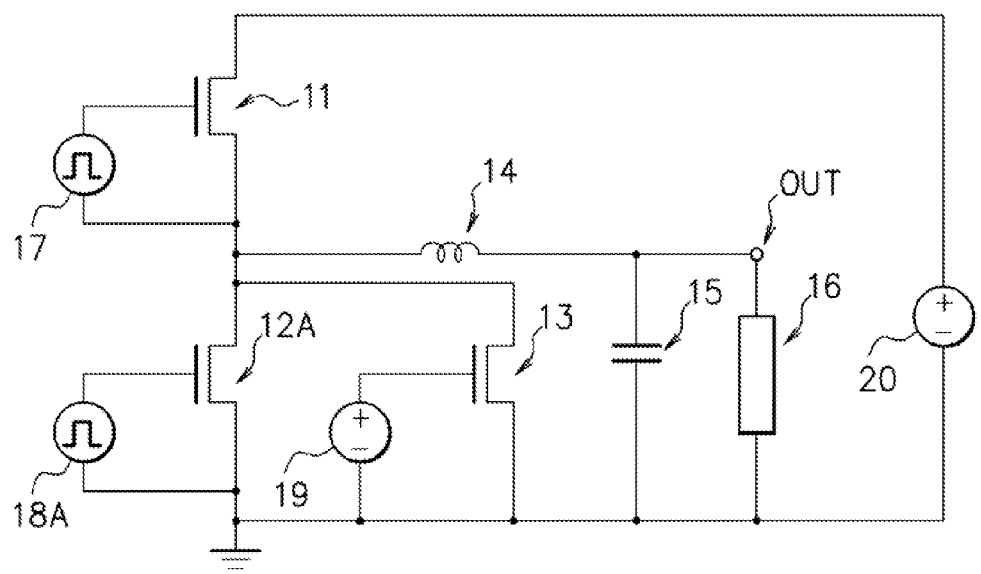
F I G. 2
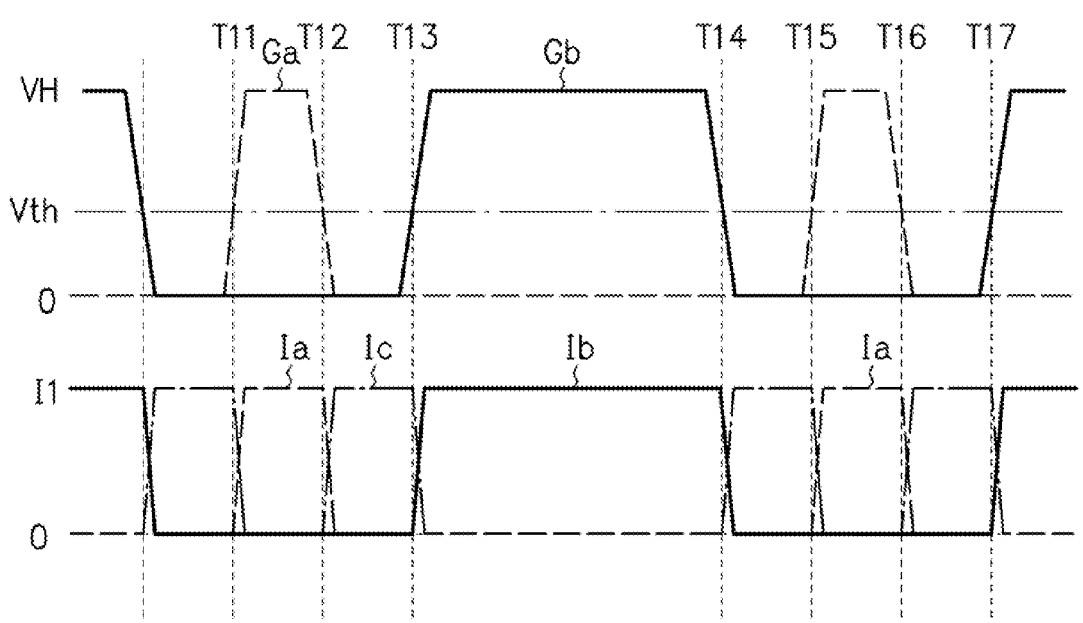

F I G. 5
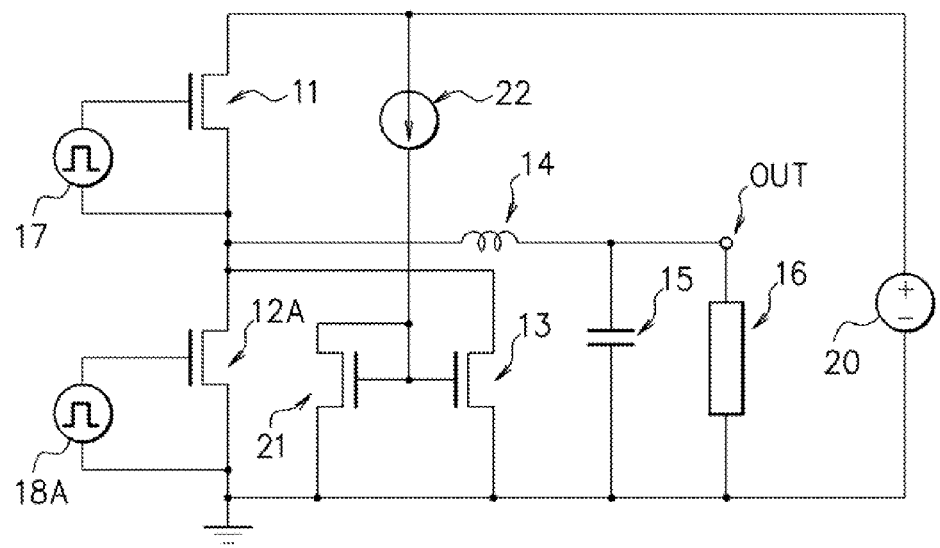
F I G. 6
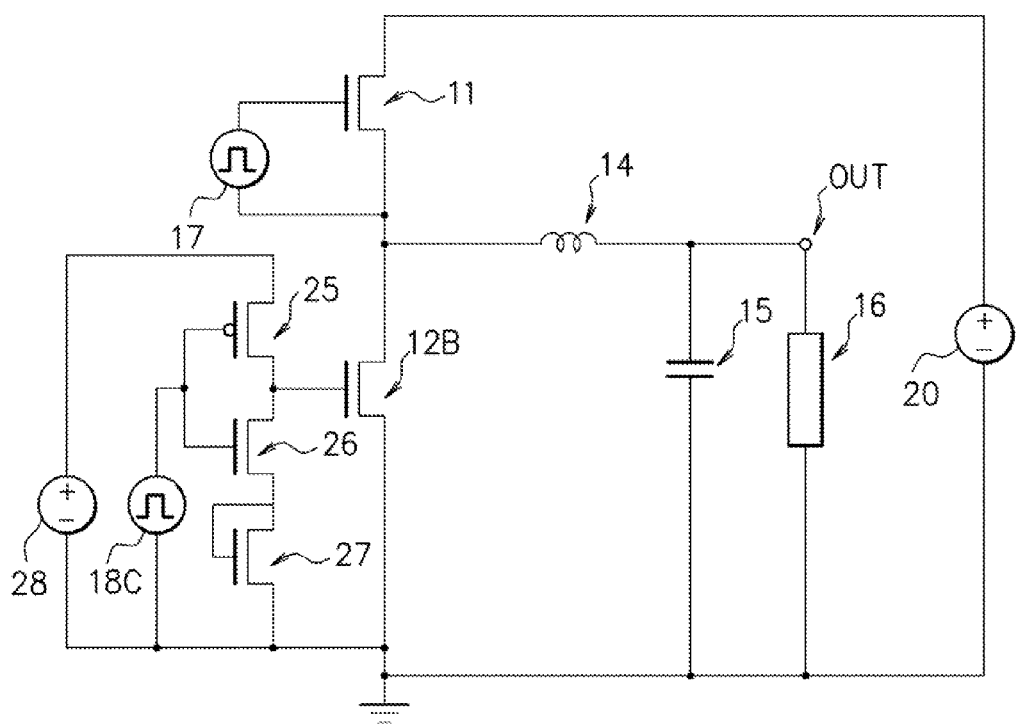

STEP-DOWN TYPE DC-DC REGULATOR

CROSS-REFERENCE TO RELATED APPLICATIONS

This application is based upon and claims the benefit of priority of the prior Japanese Patent Application No. 2010-242457, filed on Oct. 28, 2010, the entire contents of which are incorporated herein by reference.

FIELD

The embodiments discussed herein are directed to a regulator circuit.

BACKGROUND

There is a step-down type DC-DC regulator (buck regulator) in which an output (direct-current) voltage lower than an input (direct-current) voltage is output to a load as a power-supply circuit.

FIG. 8 is a view illustrating a configuration example of a general step-down type DC-DC regulator. In FIG. 8, a reference numeral 101 is a first transistor, a reference numeral 102 is a second transistor, a reference numeral 103 is an inductor, a reference numeral 104 is a capacitor, a reference numeral 105 is a load, a reference numeral 106 is a schottky barrier diode (SBD), a reference numeral 107 is a first control circuit, a reference numeral 108 is a second control circuit, and a reference numeral 109 is a voltage source.

The first transistor 101 is a high voltage side (high-side) switching element, and the second transistor 102 is a low voltage side (low-side) switching element. In the first transistor 101, a drain is coupled to a power supply line to which an input voltage from the voltage source 109 is supplied, and a source is coupled to one end of the inductor 103. In the second transistor 102, a drain is coupled to an interconnection point between the source of the transistor 101 and the one end of the inductor 103, and a source is coupled to a reference voltage line (for example, a ground).

The first transistor 101 and the second transistor 102 are on/off controlled by rectangular waves (pulse signals) respectively output from the first control circuit 107 and the second control circuit 108. The DC-DC regulator illustrated in FIG. 8 outputs an output voltage to the load 105 via a low-pass filter made up of the inductor 103 and the capacitor 104 by alternately turning on/off the transistors 101, 102 with the rectangular waves output from the control circuits 107, 108.

Here, when the transistors 101, 102 are simultaneously turned on in the DC-DC regulator illustrated in FIG. 8, a short circuit occurs between the power supply line and the reference voltage line, a short-through current flows through the transistors 101, 102, and heat is generated and so on in circuit elements. A period called as a dead time is therefore provided in the DC-DC regulator as illustrated in FIG. 8 to prevent that the transistors 101, 102 are simultaneously turned on. The dead time is the period when the transistors 101, 102 are simultaneously turned into off states by shifting a timing to turn-off one transistor and a timing to turn-on the other transistor.

The DC-DC regulator is in a state in which it does not operate as a circuit because both of the transistors 101, 102 are in the off states during the dead time, but efficiency deteriorates because loss is generated during the dead time. There is a method to keep current flow through a path of the inductor 103, the load 105, the schottky barrier diode 106 during the dead time by providing the schottky barrier diode 106 to make a return current flow as illustrated in FIG. 8 to improve the efficiency deterioration. Note that a method is also conceivable in which the schottky barrier diode 106 is not provided but a body diode of the second transistor 102 is used. However, an effect of the efficiency improvement is small because a reverse recovery time (a time to be an off state from a continuity state) is long and a forward drop voltage is also large in the body diode compared to the schottky barrier diode.

A DC-DC converter enabling an electro static discharge protection function and a conversion efficiency improvement at a low current area is disclosed in Patent Document 1. Besides, a method is disclosed in Patent Documents 2, 3 in which the dead time is made short by adjusting a period from the time one transistor is turned off to the time the other transistor is turned on based on a voltage detection result and so on at a detection point in a step-down type DC-DC converter.

In the step-down type DC-DC regulator as illustrated in FIG. 8, it is desirable that the return current is made flow by using the schottky barrier diode of which reverse recovery time is short to suppress the efficiency deterioration caused by the dead time. However, there are problems in which the schottky barrier diode is expensive, and a high withstand voltage product is few.

[Patent Document 1] Japanese Laid-open Patent Publication No. 2010-27709

[Patent Document 2] Japanese National Publication of International Patent Application No. 2006-508629

[Patent Document 3] Japanese Laid-open Patent Publication No. 2007-185050

SUMMARY

According to an aspect of the present embodiment, a regulator circuit, including: a first transistor in which a drain is coupled to a power supply line, and a source is coupled to the other end of an inductor of which one end is coupled to one end of a load; a second transistor in which a drain is coupled to the source of the first transistor, and a source is coupled to a reference voltage line; and a third transistor in which a drain is coupled to the source of the first transistor, a source is coupled to the other end of the load, is provided. A gate voltage which is less than a threshold voltage and approximately the threshold voltage of the third transistor is supplied to the gate of the third transistor during a period when both of the first transistor and the second transistor are controlled to be in off states.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view illustrating a configuration example of a regulator circuit in a first embodiment;

FIG. 2 is a schematic diagram illustrating an operational waveform example of the regulator circuit in the first embodiment;

FIG. 5 is a view illustrating a configuration example of a regulator circuit in a third embodiment;

FIG. 6 is a view illustrating a configuration example of a regulator circuit in a fourth embodiment;

DESCRIPTION OF EMBODIMENTS

Figure 3:
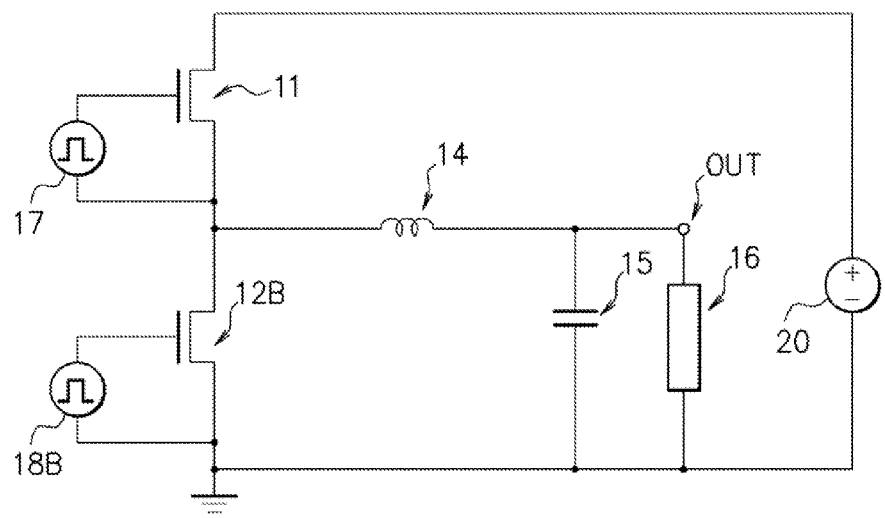
FIG. 3 is a view illustrating a configuration example of a regulator circuit in a second embodiment.

Hereinafter, the embodiments will be explained with reference to accompanying drawings.

A regulator circuit in each of embodiments described below is a step-down type DC-DC regulator circuit in which a direct-current output voltage lower than an input direct-current voltage (input voltage) is output to a load. The regulator circuit in each of the embodiments is used as a power-supply circuit of each equipment, and used for, for example, a power-supply circuit relating to a computer, power-supply circuits and so on relating to display devices such as a plasma display device, a liquid crystal display device, and so on.

(First Embodiment)

A first embodiment is described.

FIG. 1 is a circuit diagram illustrating a configuration example of a regulator circuit in the first embodiment. In FIG. 1, a reference numeral 11 is a first transistor, a reference numeral 12A is a second transistor, a reference numeral 13 is a third transistor, a reference numeral 14 is an inductor, a reference numeral 15 is a capacitor, a reference numeral 16 is a load, a reference numeral 17 is a first control circuit, a reference numeral 18A is a second control circuit, a reference numeral 19 is a first voltage source, and a reference numeral 20 is a second voltage source.

The first transistor 11 is a high voltage side (high-side) switching element. In the first transistor 11, a drain is coupled to a power supply line to which an input voltage from the voltage source 20 is supplied, a source is coupled to one end of the inductor 14, and a gate is coupled to the first control circuit 17. A gate voltage is supplied to the gate of the first transistor 11 from the first control circuit 17.

The second transistor 12A is a low voltage side (low-side) switching element. In the second transistor 12A, a drain is coupled to an interconnection point between the source of the first transistor 11 and the one end of the inductor 14, a source is coupled to a reference voltage line (for example, a ground), and a gate is coupled to the second control circuit 18A. A gate voltage is supplied to the gate of the second transistor 12A from the second control circuit 18A.

The third transistor 13 forms a current path to make a return current flow during a dead time. In the third transistor 13, a drain is coupled to the interconnection point between the source of the first transistor 11 and the one end of the inductor 14, a source is coupled to the reference voltage line, and a gate is coupled to the voltage source 19. A constant voltage is supplied to the gate of the third transistor 13 from the voltage source 19 as a gate voltage.

Here, so-called a power transistor is used as each of the transistors 11, 12A, 13. The transistors 11, 12A, 13 are, for example, a power MOS (metal-oxide-semiconductor) transistor, GaN HEMI (gallium nitride high electron mobility transistor).

The other end of the inductor 14 is coupled to an output end OUT. One electrode of the capacitor 15 is coupled to an interconnection point between the other end of the inductor 14 and the output end OUT, the other electrode of the capacitor 15 is coupled to the reference voltage line. One end of the load 16 is coupled to the output end OUT, and the other end of the load 16 is coupled to the reference voltage line. A low pass filter is made up of the inductor 14 and the capacitor 15, and an input from the one end of the inductor 14 is averaged by the low pass filter, and output to the load 16 via the output end OUT.

The first control circuit 17 supplies a rectangular wave (pulse signal) of which voltage at high level is VH and voltage at low level is a reference voltage (for example, 0 (zero) (V)) to the gate of the first transistor 11, and performs an on/off control of the first transistor 11. The second control circuit 18A supplies the rectangular wave (pulse signal) of which voltage at high level is VH and voltage at low level is the reference voltage (for example, 0 (zero) (V)) to the gate of the second transistor 12A, and performs the on/off control of the second transistor 12A. The voltage VH is a voltage higher than threshold voltages of the first transistor 11 and the second transistor 12A. Each of the first transistor 11 and the second transistor 12A becomes on state (sufficient low resistance state) when the voltage VH is applied as the gate voltage.

The first voltage source 19 supplies a voltage which is less than a threshold voltage and approximately the threshold voltage of the third transistor 13 to the gate of the third transistor 13 as the gate voltage. The gate voltage as stated above is supplied, and thereby, the third transistor 13 becomes a state in which a current seldom flows in a forward direction (a direction from the drain to the source), but it is possible to sufficiently flow the current in a reverse direction (a direction from the source to the drain). When the threshold voltage of the third transistor 13 is set to be Vth, it is desirable that a voltage supplied by the first voltage source 19 (the gate voltage supplied to the third transistor 13) is 0.9 Vth to 0.99 Vth. For example, when the threshold voltage of the third transistor 13 is 2 (V), it is desirable that the voltage of 1.8 (V) to 1.98 (V) is supplied as the gate voltage. The second voltage source 20 supplies the input voltage to the power supply line.

Next, operations are described. FIG. 2 is a schematic diagram illustrating an operational waveform example of the regulator circuit in the first embodiment. In FIG. 2, a reference symbol Ga represents the gate voltage supplied to the first transistor 11, a reference symbol Gb represents the gate voltage supplied to the second transistor 12A, and the voltage at high level is VH, and the voltage at low level is "0" (zero) (V). The reference symbol Vth is the threshold voltage of the first transistor 11 and the second transistor 12A.

The regulator circuit illustrated in FIG. 1 outputs an output voltage to the load 16 via the low pass filter made up of the inductor 14 and the capacitor 15 by alternately turning on/off the transistors 11, 12A with the rectangular waves output from the control circuits 17, 18A. During a period when the first transistor 11 is turned on and the second transistor 12A is turned off (T11 to T12, T15 to T16), a current Ia flows through a path of the power supply line, the first transistor 11, the inductor 14 and the load 16, and energy is accumulated at the inductor 14. During a period when the first transistor 11 is turned off and the second transistor 12A is turned on (T13 to T14), the inductor 14 releases the energy, and a current Ib flows through a path of the reference voltage line, the second transistor 12A, the inductor 14 and the load 16.

The dead times, namely, periods when the first transistor 11 and the second transistor 12A are simultaneously made in off states (T12 to T13, T14 to T15, T16 to T17) are also provided at the regulator circuit illustrated in FIG. 1. At the dead time, the first transistor 11 and the second transistor 12A are made in complete off states, but it is possible to keep a current (return current) Ic flow through a path of the inductor 14, the load 16 and the third transistor 13 (current path) in the regulator circuit illustrated in FIG. 1. It is thereby possible to suppress efficiency deterioration caused by the dead time and to improve the efficiency of the regulator circuit. Besides, it is also possible to suppress cost increase because the above-stated effects may be enabled by using the transistor without using an expensive element such as a schottky barrier diode.

(Second Embodiment)

Next, a second embodiment is described.

FIG. 3 is a circuit diagram illustrating a configuration example of a regulator circuit in the second embodiment. In FIG. 3, the same reference numerals and symbols are used to designate elements having the same functions as the elements illustrated in FIG. 1, and the redundant description thereof will not be given. In FIG. 3, a reference numeral 12B is a second transistor, and a reference numeral 18B is a second control circuit.

In the regulator circuit in the first embodiment illustrated in FIG. 1, the efficiency deterioration caused by the dead time is suppressed by providing the third transistor 13 and the voltage source 19 supplying the constant gate voltage to the third transistor 13. In the regulator circuit in the second embodiment illustrated in FIG. 3, the functions of the second transistor 12A and the third transistor 13 illustrated in FIG. 1 are enabled by one second transistor 12B.

The second transistor 12B is a low voltage side (low-side) switching element, and forms a current path to make the return current flow. In the second transistor 12B, a drain is coupled to an interconnection point between the source of the first transistor 11 and one end of the inductor 14, a source is coupled to the reference voltage line, and a gate is coupled to the second control circuit 18B. The gate voltage is supplied to the gate of the second transistor 12B from the second control circuit 18B.

The second control circuit 18B supplies a rectangular wave (pulse signal) of which voltage at high level is VH and voltage at low level is less than a threshold voltage and approximately the threshold voltage of the second transistor 12B to the gate of the second transistor 12B. Namely, in the present embodiment, a voltage within a range of (less than the threshold voltage and approximately the threshold voltage) to (the voltage VH) is supplied to the second transistor 12B as the gate voltage. The continuity state of the second transistor 12B is thereby controlled. The second transistor 12B becomes a sufficient on state when the high level (the voltage VH) is supplied as the gate voltage. On the other hand, the second transistor 12B does not become a completely off state, but becomes a state in which a current seldom flows in a forward direction, but the current may be made flow sufficiently in a reverse direction when the low level is supplied as the gate voltage.

Figure 4:
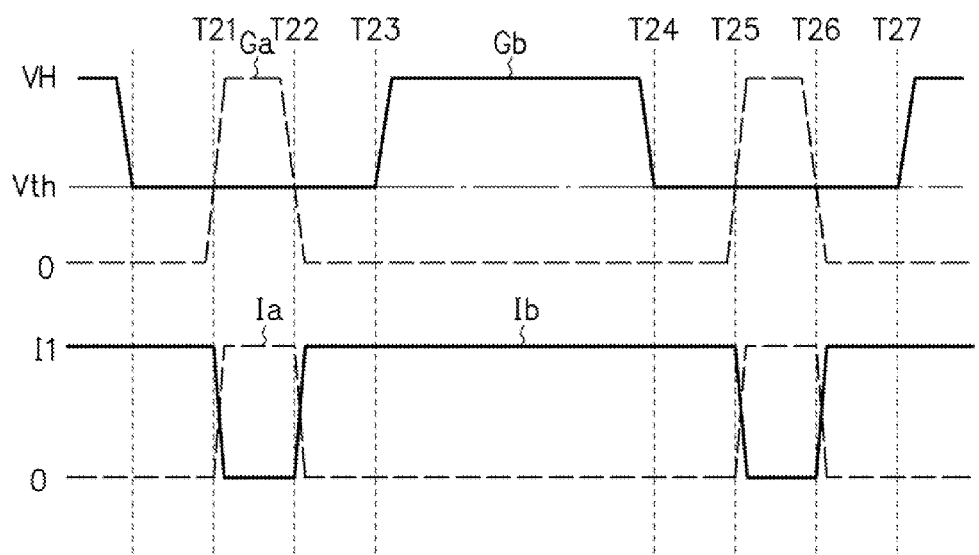
FIG. 4 is a schematic diagram illustrating an operational waveform example of the regulator circuit in the second embodiment.

Next, operations are described. FIG. 4 is a schematic diagram illustrating an operational waveform example of the regulator circuit in the second embodiment. In FIG. 4, a reference symbol Ga is a gate voltage supplied to the first transistor 11, and of which voltage at high level is VH, and voltage at low level is "0" (zero) V. A reference symbol Gb is a gate voltage supplied to the second transistor 12B, the voltage at high level is VH, and a voltage at low level is a voltage slightly lower than the voltage Vth. Note that Vth is the threshold voltage of the first transistor 11 and the second transistor 12B.

A basic operation in which the output voltage is output to the load 16 via the low pass filter made up of the inductor 14 and the capacitor 15 by alternately turning on/off the transistors 11, 12B with the rectangular wave output from the control circuits 17, 18B is the same as the first embodiment. Note that times T21 to T27 illustrated in FIG. 4 respectively correspond to the times T11 to T17 illustrated in FIG. 2. In the regulator circuit illustrated in FIG. 3, the voltage which is less than the threshold voltage and approximately the threshold voltage is supplied to the second transistor 12B as the gate voltage during the period when the transistors 11, 12B are controlled to be simultaneously in off states (T22 to T23, T24 to T25, T26 to T27). Accordingly, it is possible to keep the current flow through the path of the inductor 14, the load 16, the second transistor 12B (current path) during the period when the transistors 11, 12B are controlled to be simultaneously in off states. It is thereby possible to suppress the efficiency deterioration caused by the dead time and to improve the efficiency of the regulator circuit. Besides, it is possible to further suppress the cost increase because one transistor and one voltage source may be reduced compared to the first embodiment.

The threshold voltage of the power transistors (for example, the power MOS transistor, GaN HEMI) used as the transistors 11 to 13 in the above-stated respective embodiments has temperature dependence. A third and a fourth embodiment described below compensate the gate voltage supplied to the transistor relating to the current path to make the return current flow, and thereby, it is enabled to supply the appropriate gate voltage according to temperature environment and so on.

(Third Embodiment)

Next, the third embodiment is described. In the third embodiment, a compensation circuit compensating the gate voltage supplied to the third transistor 13 is provided at the regulator circuit in the first embodiment. FIG. 5 is a circuit diagram illustrating a configuration example of a regulator circuit in the third embodiment. In FIG. 5, the same reference numerals and symbols are used to designate elements having the same functions as the elements illustrated in FIG. 1, and the redundant description thereof will not be given. In FIG. 5, a reference numeral 21 is a fourth transistor, and a reference numeral 22 is a current source.

In the fourth transistor 21, a gate and a drain is coupled to the current source 22, and a source is coupled to the reference voltage line. Besides, the gate of the fourth transistor 21 is coupled to the gate of the third transistor 13. Namely, the fourth transistor 21 is current-mirror-coupled to the third transistor 13. The fourth transistor 21 is the same type (the same size) as the third transistor 13, and the temperature dependence of circuit characteristics is the same. Accordingly, a threshold voltage of the fourth transistor 21 varies as the threshold voltage of the third transistor 13 varies caused by a change of temperature and so on. The gate voltage in accordance with the varied threshold voltage is therefore supplied to the gate of the third transistor 13. It is thereby possible to temperature compensate the gate voltage supplied to the third transistor 13 relating to the current path to flow the return current, and to supply the appropriate gate voltage. Note that manufacturing variance of the threshold voltage of the transistor is also compensated by the above-stated configuration. Besides, it is possible to obtain higher effect as for the compensation relating to characteristic changes by forming the third transistor 13 and the fourth transistor 21 on an identical chip. Note that the operation (operational waveform) of the regulator circuit in the third embodiment is the same as that of the first embodiment, and therefore, the description is not given.

(Fourth Embodiment)

Next, the fourth embodiment is described. In the fourth embodiment, a compensation circuit compensating the gate voltage supplied to the second transistor 12B is provided at the regulator circuit in the second embodiment. FIG. 6 is a circuit diagram illustrating a configuration example of a regulator circuit in the fourth embodiment. In FIG. 6, the same reference numerals and symbols are used to designate elements having the same functions as the elements illustrated in FIG. 1 and FIG. 3, and the redundant description thereof will not be given. In FIG. 6, a reference numeral 18C is a second control circuit, a reference numeral 25 is a fifth transistor, a reference numeral 26 is a sixth transistor, a reference numeral 27 is a seventh transistor, and a reference numeral 28 is a voltage source.

The fifth transistor 25 is a p-channel transistor. In the fifth transistor 25, a source is coupled to a power supply line to which power is supplied from the voltage source 28, a drain is coupled to a drain of the sixth transistor 26. The sixth transistor 26 is an n-channel transistor. A source of the sixth transistor 26 is coupled to a drain of the seventh transistor 27. Gates of the fifth transistor 25 and the sixth transistor 26 are coupled to the second control circuit 18C. The interconnection point between the drains of the fifth transistor 25 and the sixth transistor 26 is coupled to the gate of the second transistor 12B.

In the seventh transistor 27, a gate is coupled to a drain, and a source is coupled to the reference voltage line. Namely, the seventh transistor 27 is diode-coupled. The seventh transistor 27 is the same type (the same size) as the second transistor 12B, and the temperature dependence of the circuit characteristics is the same. The second control circuit 18C outputs a rectangular wave (pulse signal) to perform the on/off control of the second transistor 12B.

As stated above, an inverter is made up of the fifth transistor 25 and the sixth transistor 26 in the fourth embodiment. This inverter functions as a drive circuit of the second transistor 12B, performs a logical inversion of the rectangular wave output from the second control circuit 18C and supplies the rectangular wave to the gate of the second transistor 12B. Besides, a voltage at high voltage side is supplied from the voltage source 28, and a voltage at low voltage side is supplied from the diode-coupled seventh transistor 27 to the inverter made up of the fifth transistor 25 and the sixth transistor 26. Accordingly, the voltage from the voltage source 28 is supplied as high level, and a threshold voltage level of the seventh transistor 27 is supplied as low level to the gate of the second transistor 12B. The seventh transistor 27 and the second transistor 12B are the same type as stated above, and therefore, the threshold voltage of the seventh transistor 27 varies similarly as the threshold voltage of the second transistor 12B varies resulting from the change of the temperature and so on. It is thereby possible to temperature-compensate the gate voltage supplied to the second transistor 12B relating to the current path to flow the return current, and to supply the appropriate gate voltage. Note that the manufacturing variance of the threshold voltage of the transistor is also compensated by the above-stated configuration. Besides, a higher effect may be obtained as for the compensation relating to the characteristic change by forming the second transistor 12B and the seventh transistor 27 on an identical chip.

Figure 7:
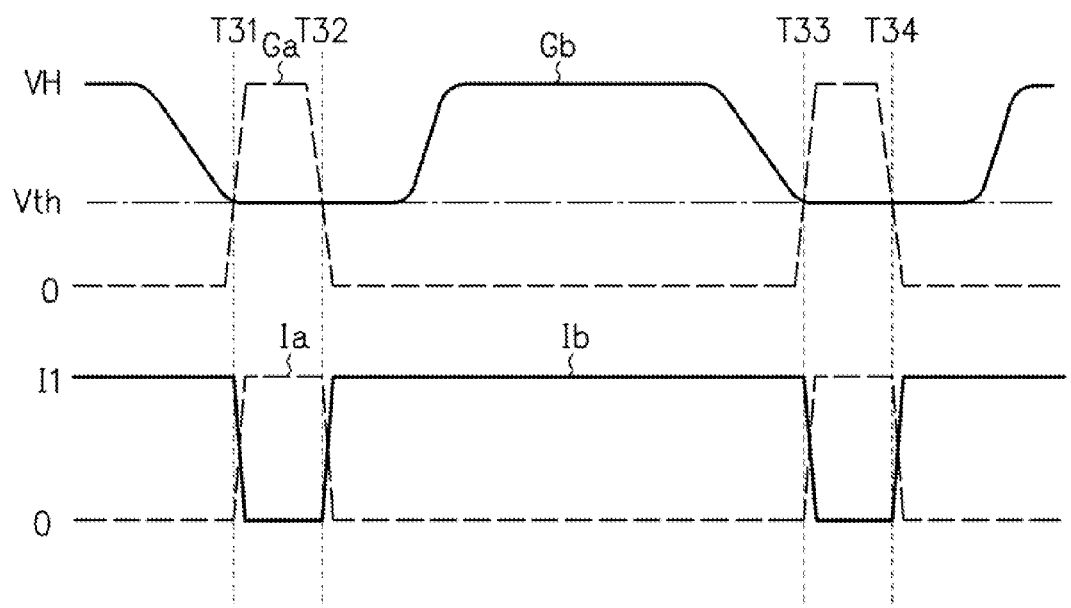
FIG. 7 is a schematic diagram illustrating an operational waveform example of the regulator circuit in the fourth embodiment.
Figure 8:
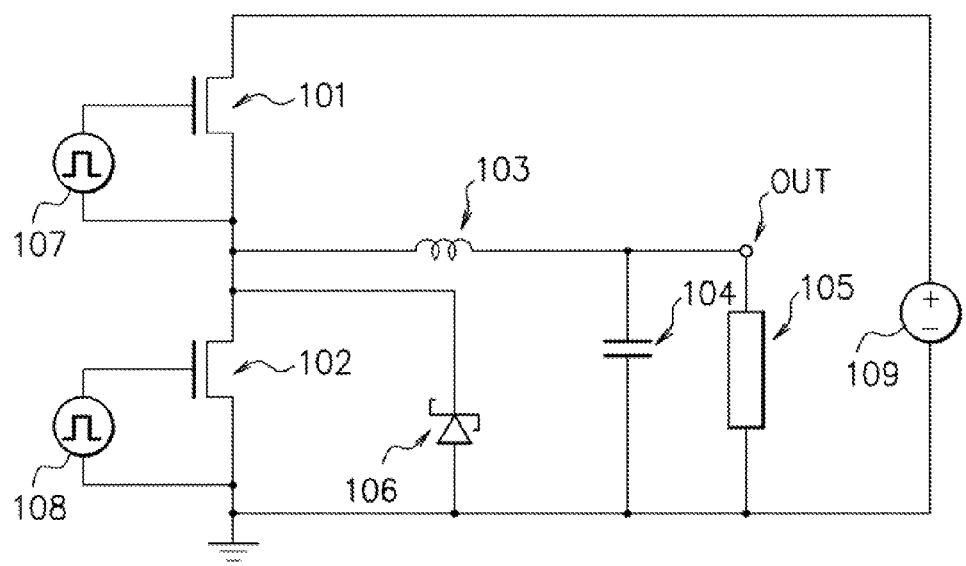
FIG. 8 is a view illustrating a configuration example of a conventional regulator circuit.

FIG. 7 is a schematic diagram illustrating an operational waveform example of the regulator circuit in the fourth embodiment. In FIG. 7, a reference symbol Ga is a gate voltage supplied to the first transistor 11, a reference symbol Gb is a gate voltage supplied to the second transistor 12B. In the regulator circuit in the fourth embodiment, the gate voltage Gb supplied to the second transistor 12B is driven by the inverter to which the voltage from the voltage source 28 is supplied as high potential and the threshold voltage level of the seventh transistor 27 is supplied as low potential. Accordingly, a change of a drive waveform of the gate voltage Gb supplied to the second transistor 12B becomes moderate, but the operation in itself is the same as the second embodiment.

The disclosed regulator circuit is able to continuously flow the current through the current path of the inductor, the load, and the third transistor during the dead time when the first transistor and the second transistor are both controlled to be in off states, and to improve the efficiency deterioration caused by the dead time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A regulator circuit, comprising:
   a first transistor, a drain of the first transistor coupled to a power supply line to which an input voltage is supplied, a source of the first transistor coupled to one end of an inductor, the other end of the inductor coupled to one end of a load to which an output voltage is supplied;
   a second transistor, a drain of the second transistor coupled to the source of the first transistor, a source of the second transistor coupled to the other end of the load and a reference voltage line; and
   a control circuit configured to supply a rectangular wave to a gate of the second transistor, voltage of the rectangular wave at low level being in a range of 0.9 V to 0.99 V, V being a threshold voltage of the second transistor,
   a compensation circuit configured to compensate a gate voltage supplied to the gate of the second transistor,
   wherein the voltage of the low level of the rectangular wave is supplied to the gate of the second transistor during a period when the first transistor is controlled to be in off state, and wherein the compensation circuit includes a fifth transistor and a drive circuit coupled to the reference voltage line via the fifth transistor, the drive circuit configured to drive the second transistor, wherein a drain of the fifth transistor is coupled to the drive circuit, a gate of the fifth transistor coupled to the drain of the fifth transistor and a source of the fifth transistor coupled to the reference voltage line.

2. The regulator circuit according to claim 1, wherein the second transistor and the fifth transistor are formed on an identical chip.

* * * * *